United States Patent
Farshizadeh et al.

(10) Patent No.: US 11,592,345 B2
(45) Date of Patent: Feb. 28, 2023

(54) METHOD FOR DETECTING THE PRESENCE OF HANDS ON THE STEERING WHEEL

(71) Applicant: TRW Automotive GmbH, Alfdorf (DE)

(72) Inventors: Emad Farshizadeh, Düsseldorf (DE); Tobias Oesterwind, Düsseldorf (DE); Arno Luengen, Cologne (DE); Dirk Zimmermann, Aachen (DE)

(73) Assignee: ZF Automotive Germany GmbH, Alfdorf (DE)

( * ) Notice: Subject to any disclaimer, the term of this patent is extended or adjusted under 35 U.S.C. 154(b) by 613 days.

(21) Appl. No.: 16/609,676

(22) PCT Filed: May 8, 2018

(86) PCT No.: PCT/EP2018/061890
§ 371 (c)(1),
(2) Date: Oct. 30, 2019

(87) PCT Pub. No.: WO2018/210638
PCT Pub. Date: Nov. 22, 2018

(65) Prior Publication Data
US 2020/0232859 A1    Jul. 23, 2020

(30) Foreign Application Priority Data
May 15, 2017  (DE) ..................... 10 2017 110 549.2

(51) Int. Cl.
*G01L 5/22*   (2006.01)
*G01L 3/10*   (2006.01)
*B62D 15/02*  (2006.01)

(52) U.S. Cl.
CPC ............. *G01L 5/221* (2013.01); *G01L 3/10* (2013.01); *B62D 15/024* (2013.01); *B62D 15/0215* (2013.01)

(58) Field of Classification Search
CPC ...... B62D 1/286; B62D 5/0463; B62D 6/008; B62D 15/0215; B62D 15/024; G01L 5/221; G01L 3/10
See application file for complete search history.

(56) References Cited

U.S. PATENT DOCUMENTS 10,457,323 B2 * 10/2019 Rohrmoser ............ B62D 5/006
10,942,075 B2 *  3/2021 Oschlies ................. B62D 6/10
(Continued)

FOREIGN PATENT DOCUMENTS

DE    102007039332 A1 *  2/2008  ............ B60W 40/09
DE    102007039332 A1     2/2008
(Continued)

*Primary Examiner* — Octavia Davis Hollington
(74) *Attorney, Agent, or Firm* — Robert James Harwood

(57) ABSTRACT

Method for detecting the presence of a driver's hands on the steering wheel is described. By a mathematical model, at least one part of a steering system of the motor vehicle is modeled. In addition, a rotational angle of a lower end and/or an upper end of a torsion bar of the steering system is determined. A torque acting on the torsion bar is determined by a measuring device. A sum of a torque with which the driver acts on the steering wheel and a counter-torque generated by friction in the upper part of the steering system is estimated by a Kalman Filter. In addition, the counter-torque is estimated, and the estimated sum of the torque and the counter-torque are used to determine whether the driver's hands are on the steering wheel.

14 Claims, 2 Drawing Sheets

(56) References Cited

U.S. PATENT DOCUMENTS

| | | | |
|---|---|---|---|
| 2012/0191266 A1* | 7/2012 | Kluge | B60W 40/09 |
| | | | 701/1 |
| 2020/0140007 A1* | 5/2020 | Farshizadeh | B62D 6/08 |
| 2021/0171094 A1* | 6/2021 | Farshizadeh | B62D 5/0463 |

FOREIGN PATENT DOCUMENTS

| | | | |
|---|---|---|---|
| DE | 102009028647 A1 * | 2/2011 | B62D 15/025 |
| DE | 102009028647 A1 | 2/2011 | |
| DE | 102011002401 A1 | 7/2012 | |
| DE | 102011002997 A1 | 7/2012 | |
| DE | 102016209833 A1 | 12/2017 | |

* cited by examiner

METHOD FOR DETECTING THE PRESENCE OF HANDS ON THE STEERING WHEEL

CROSS-REFERENCE TO RELATED APPLICATION

This application is a national stage of International Application No. PCT/EP2018/061890, filed May 8, 2018, the disclosure of which is incorporated herein by reference in its entirety, and which claimed priority to German Patent Application No. 102017110549.2, filed May 15, 2017, the disclosure of which is incorporated herein by reference in its entirety.

TECHNICAL FIELD

The invention relates to a method for detecting the presence of a driver's hands on the steering wheel of a motor vehicle, in particular a motor vehicle with an electromechanically assisted steering system.

BACKGROUND

In motor vehicles with an electromechanically assisted steering system, the electromechanical steering assistance can act on the steering system with a torque and thus assist the driver while driving or steering the vehicle in a certain direction. In particular, the electromechanical steering assistance can steer the vehicle automatically, i.e., without a corresponding steering movement by the driver in a certain direction, for example, based on data from a camera or other sensors. The automatic steering of motor vehicles is used in particular in control systems, at least partially in motor vehicles that move autonomously. An example of such a control system are the so-called lane keeping assistance systems, which help the driver to maintain a lane. However, the driver of the motor vehicle should be able to take full control of the motor vehicle again at any time. The presence of the driver's hands on the steering wheel provides a reliable indication for this purpose.

In the case of fully autonomous motor vehicles, the control system should automatically control the motor vehicle as long as the driver does not want to take control of the motor vehicle by himself. When the driver puts his hands on the steering wheel, this is a clear indication that he wants to take control of the vehicle. On the contrary, if the driver takes his hands off the steering wheel, the automatic control system should take the control of the motor vehicle.

Therefore, it is necessary in both cases to be able to detect the presence of the driver's hands on the steering wheel. One way to detect the presence of hands on the steering wheel are additional sensors on the steering wheel. The sensors detect, for example, via capacitance measurement whether the hands are on the steering wheel. However, additional sensors generate additional costs.

SUMMARY

Therefore, the object of the invention is to provide a method for detecting the presence of hands on the steering wheel, in which no additional sensors are necessary with respect to existing torque sensors and/or angle sensors included in the electromechanically assisted steering system.

The object is achieved according to the invention via a method of the aforementioned type comprising the following steps:

by means of a mathematical model, at least one part of a steering system of the motor vehicle is modeled, a rotation angle of a lower end and/or an upper end of a torsion bar of the steering system is determined, a torque acting on the torsion bar is determined by means of a measuring device, a sum of a torque with which the driver acts on the steering wheel, and a counter-torque generated by friction in the upper part of the steering system is estimated by means of a Kalman Filter, the counter-torque is estimated, and the estimated sum of the torque and the counter-torque are used to determine whether the drivers hands are on the steering wheel.

It has been demonstrated that a motor vehicle's driver also acts on the steering wheel with a torque over a certain period of time at least occasionally, even if he is not consciously controlling the vehicle in one direction. Therefore, this method is also suitable for detecting the presence of hands on the steering wheel, if the driver does not consciously apply a torque to the steering wheel. The method according to the invention uses only the already existing sensors in the steering system to detect the presence of the driver's hands on the steering wheel, in particular a torque sensor that determines at least the torque acting on the torsion bar. More specifically, no additional sensors are required, which saves costs.

According to one aspect of the invention, the entire steering system is modeled by means of the mathematical model. In particular, both an upper part of the steering system of the motor vehicle comprising the steering wheel, a steering column with torsion bar and the measuring device, and also a lower part of the steering system of the motor vehicle is modeled.

According to another aspect, by means of the mathematical model an upper part of the steering system of the motor vehicle is modeled, which comprises a steering wheel, a steering column with the torsion bar and the measuring device.

Another aspect provides that by means of a mathematical model a part of the steering above the torsion bar is modeled, said part comprising the steering wheel.

Preferably, an observer is designed on the basis of the mathematical model, which determines the required non-measured variables and the required non-measurable variables. By "observer" is to be understood an observer in the sense of control technology. The observer can estimate the sum of the torque with which the driver acts on the steering wheel and the counter-torque.

In particular, the steering system has an auxiliary motor with an angular position sensor. The rotation angle of the lower end of the torsion bar can then be determined by means of the angular position sensor of the auxiliary motor of the steering system.

Preferably, the torque with which the driver acts on the steering wheel is determined from the difference between the estimated sum of the torque and the estimated counter-torque. In particular, it is detected that the driver's hands are on the steering wheel when the result of the difference differs by more than a predetermined value of zero. This predetermined value may be selected in a manner that a recognition error rate is less than 10%, preferably less than 5%, more preferably 0%. In this way, it can be detected with the necessary accuracy, whether the driver's hands are on the steering wheel.

According to one aspect of the invention, a state of the steering wheel is modeled by a linear state-space model. In particular, the linear state-space model may provide the basis for the design of an observer. By "observer" is to be understood an observer in the sense of control technology. The observer can estimate the sum of the torque with which the driver acts on the steering wheel and the counter-torque.

According to a further aspect of the invention is provided that the measuring device determines the torque acting on the torsion bar from a relative angle between an upper end and the lower end of the torsion bar. Since the torque acting on the torsion bar is measured anyway, especially in electromechanically assisted steering systems, already existing sensors of the steering system can be used. Therefore, no further components are necessary, resulting in cost savings.

Preferably, a rotational angle of the steering wheel is also determined, more specifically, it is measured. In particular, a rotation angle of the upper end of the torsion bar is determined or measured, and equated with the rotation angle of the steering wheel. The rotation angle of the steering wheel in this embodiment of the invention, therefore, must not be reconstructed by the Kalman Filter, but immediately available, in particular as a measured variable.

More preferably, the measuring device measures the rotation angle of the lower end and/or the upper end of the torsion bar. If the measuring device measures only one of the two rotation angles, the other rotation angle can be reconstructed from the measured angle of rotation and from the determined torque acting on the torsion bar. In particular, the rotation angle of the upper end of the torsion bar can be equated with the rotation angle of the steering wheel. In this embodiment of the invention, no additional measuring device is necessary for measuring the rotation angle, resulting in a simpler construction of the steering system.

One aspect provides that the upper part of the steering system in the mathematical model is modeled as a mass with a spring and/or at least one damping element. By appropriate tuning of model parameters, in particular of spring and damping coefficients, the upper part of the steering system can be modeled as realistically as possible.

Another aspect provides that the modeled part of the steering system is modeled as a mass in the mathematical model. This is particularly advantageous when the rotation angle of the upper end of the torsion bar is measured. The simplified model of the upper steering system is then sufficient to determine with enough precision the torque acting on the steering wheel. The calculation effort is reduced in this embodiment of the invention. Preferably, the counter-torque is estimated by means of a non-linear friction model or a non-linear adaptive friction model. More preferably, a neural network is used to determine the counter-torque. In particular, parameters of the non-linear friction model are adjusted by means of the neural network to the current state of the steering wheel.

BRIEF DESCRIPTION OF THE FIGURES

Further advantages and features of the invention will become apparent from the following description and the drawings to which reference is made. In which are shown.

DETAILED DESCRIPTION

Figure 1:
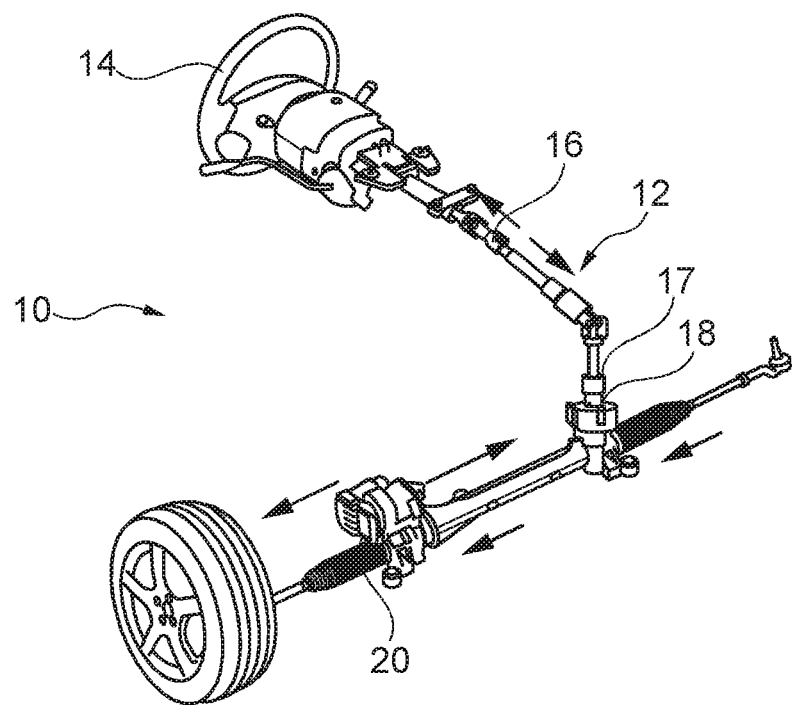
FIG. 1 shows a perspective view of a steering system of a motor vehicle.

A steering system 10 shown in FIG. 1 of a motor vehicle is designed as an electromechanically assisted steering system. The steering system 10 comprises an upper part 12 with a steering wheel 14, a steering column 16 with a torsion bar 17, and a measuring device 18 and a lower portion with an auxiliary motor 20.

The driver acts on the steering wheel 14 with a torque, so that the steering column 16 is rotated. The measuring device 18 determines a torque acting on the torsion bar 17 from a relative angle between an upper (laterally to the steering wheel) end and a lower end of the torsion bar 17. In addition, an angular position sensor of the auxiliary motor 20 determines a rotation angle of the lower end of the torsion bar 17. Based on the determined torque acting on the torsion bar 17 and on the rotation angle of the lower end of the torsion bar 17, the auxiliary motor 20 is controlled in a manner that it provides a suitable supporting torque for steering the vehicle.

In at least partially autonomous motor vehicles, it is necessary that the motor vehicle can detect whether the hands of the driver are on the steering wheel 14. In the method described below, only measured variables are used, which were already measured by the measuring device 18 and the angular position sensor of the auxiliary motor 20 of the steering system 10, more precisely, the rotation angle of the lower end of the torsion bar 17 and the torque acting on the torsion bar 17.

Figure 2:
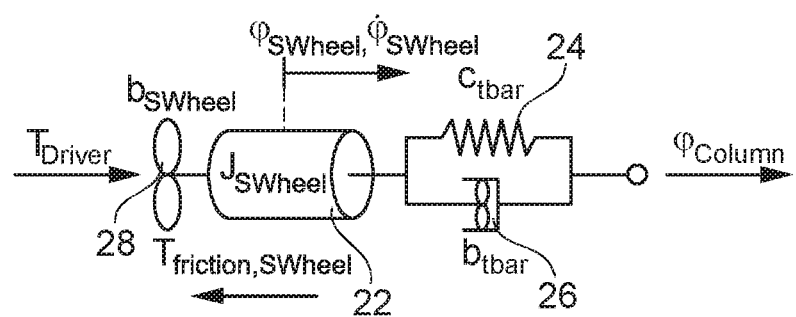
FIG. 2 shows a physical analogous model of an upper part of the steering system of FIG. 1.

The upper part 12 of the steering system 10 is first modeled according to the physical analogous model shown in FIG. 2. In this model, a system comprising the steering wheel 14, the steering column 16 with the torsion bar 17, and the measuring device 18 is modeled by a mass 22 with a moment of inertia $J_{SWheel}$, a spring 24 with a spring coefficient $c_{tbar}$ and a damping material 26, with a damping coefficient $b_{tbar}$. In this case, the spring 24 and the material damping 26 are modelling the torsion bar 17.

In addition, it is factored that via a damping element 28 with damping coefficient $b_{SWheel}$ the torque $T_{Driver}$ with which the driver acts on the steering wheel 14 is damped by viscous friction, in particular by bearing friction on the steering wheel 14. A total induced counter-torque $T_{friction}$ in the upper part 12 of the steering system 10 counteracts the torque $T_{Driver}$ by means of Coulomb friction. Equations can be deduced from the physical analogous model, which constitute a mathematical model of the upper part 12 of the steering system 10. This is explained in more detail below.

A state of the steering wheel 14 is now modeled with a linear state-space model. By "state" is to be understood a minimum set of variables $\vec{x}$, which are required to describe the system. Here, the state of the steering wheel 14 is observed. The relevant state variables are the rotation angle $\varphi_{SWheel}$ and the rotation angle speed $\dot{\varphi}_{SWheel}$ of the steering wheel 14. It is so, in particular, $$\vec{x} = \begin{pmatrix} \varphi_{SWheel} \\ \dot{\varphi}_{SWheel} \end{pmatrix}.$$

The fact that the state is dependent upon time is not explicitly shown below, but assumed implicitly. The time development of the state of the steering wheel 14 is given by the following equation:

$$\vec{\dot{x}} = A\vec{x} + B\vec{u} = A \begin{pmatrix} \varphi_{SWheel} \\ \dot{\varphi}_{SWheel} \end{pmatrix} + B \begin{pmatrix} u_{control} \\ u_{dist} \end{pmatrix}.$$

This equation represents a differential equation or a difference equation, depending on whether a continuous time evolution or a discrete time evolution is observed. In this case $u_{control} = \varphi_{column}$ represents in this embodiment, the determined (known) rotation angle of the angle position sensor of the lower end of the torsion bar. Further, $u_{dist} = T_{Driver} + T_{friction}$ represents the (unknown) sum of the torque with which the driver acts on the steering wheel 14, and the counter-torque due to the Coulomb friction. $u_{dist}$ describes an unknown disturbance of the state, occurring in the upper part 12 of the steering system 10. The matrices A and B describe the development of the state $\vec{x}$ and are dependent on the parameters of the physical analogous model.

As already mentioned, the measuring device 18 determines the torque acting on the torsion bar from the relative angle between the upper end and the lower end of the torsion bar, which is described below with $T_{tbar}$. The measured torque $T_{tbar}$ is linked to the state of the steering wheel 14 via the following equation:

$$T_{tbar} = C\vec{x} + D\vec{u}.$$

Here, the matrices C and D describe the relation between the current state $\vec{x}$ of the steering wheel 14, the partly known and partly unknown input variables $\vec{u}$ and the measured torque $T_{tbar}$. Together with the above equation for the time evolution of the state of the steering wheel 14, the above equation forms a linear state-space model for the state of the steering wheel.

From the measurement of the rotation angle of the lower part of the torsion bar and from the torque acting on the torsion bar, $u_{dist}$ can not be extrapolated directly to the state of the steering wheel 14 and the disturbance variable. Rather, the state of the steering wheel 14 and the disturbance variable $u_{dist}$ must be estimated. For this purpose, a Kalman Filter is used. Based on the measured variables and the selected physical analogous model, this filter estimates unknown input variables. More specifically, the Kalman Filter estimates the disturbance $T_{Driver} + T_{friction}$ acting on the upper part 12 of the steering system 10. The measured variable in the case discussed here, the torque $T_{tbar}$ acting on the torsion bar, and the estimated variables, in particular $u_{dist} = T_{Driver} + T_{friction}$, are then used to determine an estimation of the counter-torque $T_{friction,est}$.

According to one embodiment, the counter-torque is estimated by means of a non-linear friction model. Parameters of the nonlinear friction model are adjusted to the current state of the steering wheel, in particular by means of a neural network. For this purpose, the state variables of the steering wheel and required input variables, for example $T_{Driver} + T_{friction}$, for example, $T_{tbar}$ are estimated, in particular by the Kalman Filter. The estimated and measured variables are used to tune the parameters of the non-linear friction model, that is, to adjust the current state of the steering wheel accordingly. From the non-linear friction model, the estimated counter-torque $T_{friction,est}$ is then determined.

The estimated counter-torque is now deducted as follows from the estimated sum of the torques, obtaining an estimation of the torque $T_{Driver,est}$ with which the driver acts on the steering wheel 14:

$$T_{Driver,est} = T_{Driver} + T_{friction} - T_{friction,est}.$$

The estimated torque $T_{Driver,est}$ differs from zero when the hands (or one hand) of the driver are (is) on the steering wheel 14. Accordingly, it is detected that the hands are on the steering wheel 14 when the estimated torque $T_{Driver,est}$ differs by more than a predetermined deviation from the zero.

The deviation value may be selected in such a way that a positive error detection rate (it is detected that the hands are on the steering wheel 14, although this is incorrect) and/or a negative error detection rate (it is not detected that the hands are on the steering wheel 14, although this is not the case) is each below 10%, preferably less than 5%, particularly preferably 0%.

Figure 4:
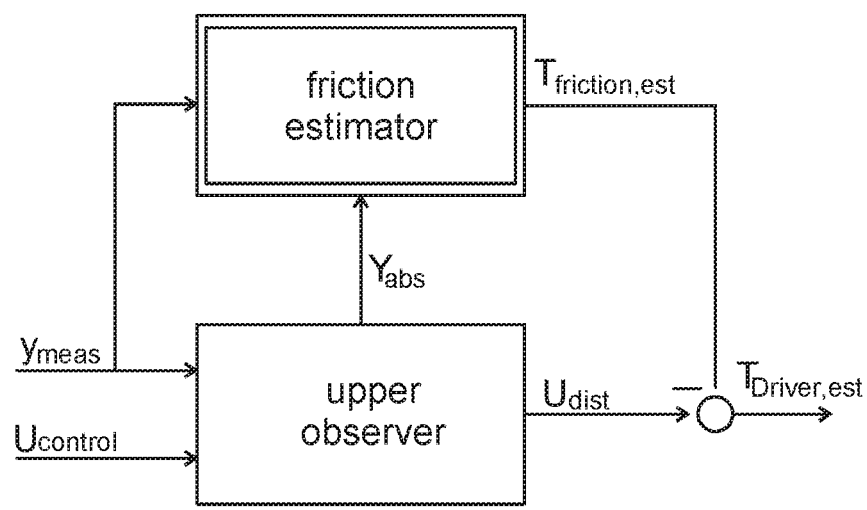
FIG. 4 shows a schematic representation of the steps of the method according to the invention.

In other words, the methods described above are based on an observer in the sense of control technology, as illustrated in FIG. 4. A real system comprising the steering wheel 14, the steering column 16 with a torsion bar, and the measuring device 18 is simulated as described above by a mathematical model. This mathematical model serves as the basis for designing the observer. From known input variables and measured variables in this case $u_{control} = \varphi_{column}$ or $y_{meas} = T_{tbar}$, unknown variables $\vec{y}_{obs}$ are estimated by the observer ("upper column observer" in FIG. 4) as described above. In addition to the observer, the friction component $T_{friction}$ as described above ("friction estimator" in FIG. 4) is provided for estimations. From the estimated variable $u_{dist}$ and the estimated friction component, the torque with which the driver acts on the steering wheel 14 can then be determined as described above via subtraction.

The rotation angle of the steering wheel 14 can alternatively be determined as follows. From the rotation angle determined by the angular position sensor of the lower end of the torsion bar 17, and the measured torque acting on the torsion bar 17, the rotation angle of the upper end of the torsion bar 17 can be reconstructed by solving the equation $$T_{tbar} = c_{tbar} \Delta \varphi$$

according to the rotation angle of the upper end of the torsion bar 17, wherein $\Delta \varphi$ represents the difference between the rotation angle of the upper end and the lower end of the torsion bar 17. In the context of the model used, the rotation angle of the upper end of the torsion bar 17 can be set equal to the rotation angle of the steering wheel 14. The rotation angle of the steering wheel 14 is then available for further calculations and does not need to be estimated by the Kalman Filter.

If the measuring device 18 of the steering system 10 is designed in such a way that in addition to the torque acting on the torsion bar 17, it can also measure the rotation angle of the lower end and/or the upper end of the torsion bar 17, then there are several simplifications compared to the method described above.

If the measuring device 18 measures the rotation angle of the lower end of the torsion bar 17, this rotation angle can be used immediately as described above for the Kalman Filter or to determine the rotation angle of the upper end of the torsion bar. Then, in particular it is not necessary to determine the rotation angle of the lower end of the torsion bar from a signal of the angular position sensor of the auxiliary motor 20.

If the measuring device 18 measures the rotation angle of the upper end of the torsion bar 17 (and thus the rotation angle of the steering wheel 14), then this rotation angle is immediately available as a measured variable for further calculations. Therefore, the rotation angle of the steering wheel 14 must in particular not necessarily be estimated by the Kalman Filter. Similarly, the rotation angles of the upper end and the lower end of the torsion bar 17 are immediately available for further calculations when the measuring device measures these two angles of rotation. Hereafter, it is assumed that the measuring device 18 is designed in such a way that it measures at least the rotation angle of the upper end of the torsion bar 17, or that the rotation angle of the upper end of the torsion bar 17 can be determined from the rotation angle of the lower end of the torsion bar.

Figure 3:
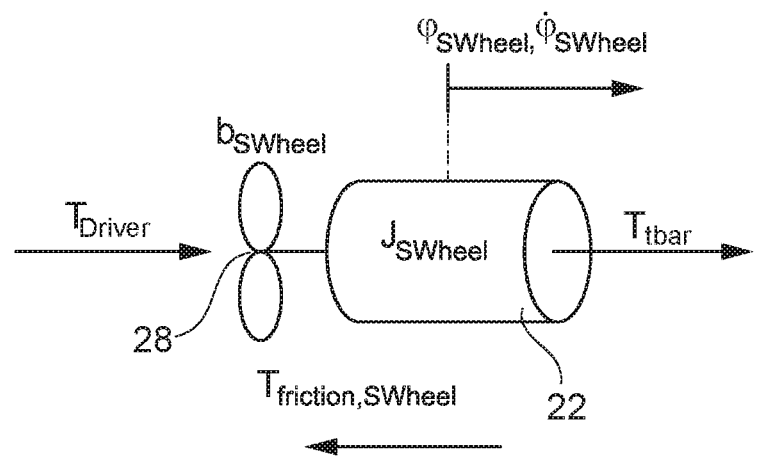
FIG. 3 shows a simplified physical analogous model of the upper part of the steering system of FIG. 1.

The upper part 12 of the steering system can then be modeled by means of a simplified physical analogous model shown in FIG. 3. Compared with the physical analogous model shown in FIG. 2, the spring 24 and the damping material 26 are omitted here. This can simplify determining the torque acting on the steering wheel 14 by means of the Kalman filter.

In this case, the measured variable is the rotation angle of the steering wheel 14, then $y_{meas}=\varphi_{SWheel}$. The known input variable is the torque acting on the torsion bar 17, so it is valid $u_{control}=T_{tbar}$.

With respect to the remaining features and other steps and advantages of the method, please refer to the above explanations.

The invention claimed is:

1. A method for detecting the presence of a driver's hands on a steering wheel of a motor vehicle, in particular a motor vehicle with an electromechanically assisted steering system, characterized by the following steps:
by means of a mathematical model, at least one part of a steering system of the motor vehicle is modeled,
a rotation angle of a lower end and/or an upper end of a torsion bar of the steering system is determined,
a torque acting on the torsion bar is determined by means of a measuring device,
a sum of a torque with which a driver acts on the steering wheel, and a counter-torque generated by friction in an upper part of the steering system is estimated by means of a Kalman Filter,
the counter-torque is estimated, and
the estimated sum of the torque and the counter-torque are used to determine whether the driver's hands are on the steering wheel.

2. The method according to claim 1, wherein by means of the mathematical model, the entire steering system is modeled.

3. The method according to claim 1, wherein by means of the mathematical model an upper part of the steering system of the motor vehicle is modeled, which comprises a steering wheel, a steering column with the torsion bar and the measuring device.

4. The method according to claim 3, wherein an observer is designed on the basis of the mathematical model, which determines required non-measured variables and required non-measurable variables and wherein the upper part of the steering system is modeled as a mass with a spring and at least one damping element in the mathematical model.

5. The method according to claim 4, wherein the modeled part of the steering system is modeled as a mass in the mathematical model.

6. The method according to claim 1, wherein by means of a mathematical model a part of a steering above the torsion bar is modeled, said part comprising the steering wheel.

7. The method according to claim 1, wherein an observer is designed on the basis of the mathematical model, which determines required non-measured variables and required non-measurable variables.

8. The method according to claim 1, wherein the torque with which the driver acts on the steering wheel is determined from the difference between the estimated sum of the torques and the estimated counter-torque.

9. The method according to claim 1, wherein a state of the steering wheel is modeled by means of a linear state model.

10. The method according to claim 1, wherein the measuring device determines the torque acting on the torsion bar from a relative angle between an upper end and the lower end of the torsion bar.

11. The method according to claim 1, wherein additionally a rotational angle of the steering wheel is determined, more specifically, it is measured.

12. The method according to claim 1, wherein the measuring device measures the rotation angle of the lower end and/or the upper end of the torsion bar.

13. The method according to claim 1, wherein the counter-torque is estimated by means of a non-linear friction model or a non-linear adaptive friction model.

14. The method according to claim 1, wherein a neural network is used to determine the counter-torque.

* * * * *